United States Patent [19]

Kametani et al.

[11] 4,190,508

[45] Feb. 26, 1980

[54] PROCESS FOR REMOVING CHALCOPHILE ELEMENTS FROM AQUEOUS SOLUTIONS BY ELECTROLYSIS

[75] Inventors: Hiroshi Kametani; Tatsuya Mitsuma, both of Tokyo, Japan

[73] Assignee: National Research Institute for Metals, Tokyo, Japan

[21] Appl. No.: 16,567

[22] Filed: Mar. 1, 1979

[30] Foreign Application Priority Data

Jun. 23, 1978 [JP] Japan .................................. 53-75488

[51] Int. Cl.$^2$ ................................................ C02C 5/12
[52] U.S. Cl. .................................... 204/151; 204/149; 204/152; 204/92
[58] Field of Search ................... 204/149, 151, 152, 92

[56] References Cited

U.S. PATENT DOCUMENTS

| 3,748,240 | 7/1973 | Johnson et al. | 204/149 |
| 3,865,744 | 2/1975 | Parker et al. | 204/92 X |
| 3,884,779 | 5/1975 | Duy et al. | 204/92 |

*Primary Examiner*—Arthur C. Prescott
*Attorney, Agent, or Firm*—Sherman & Shalloway

[57] ABSTRACT

An aqueous solution containing ions of one or more chalcophile elements is used as a catholyte and electrolyzed in the presence of elemental sulfur powder suspended therein to precipitate the chalcophile elements in the form of sulfide. The precipitated sulfide is then separated from the aqueous layer.

10 Claims, No Drawings

PROCESS FOR REMOVING CHALCOPHILE ELEMENTS FROM AQUEOUS SOLUTIONS BY ELECTROLYSIS

This invention relates to a process for separating and recovering a chalcophile element in the form of sulfide by an electrolytic technique from an aqueous solution containing an ion of the chalcophile element.

The chalcophile element has an affinity for sulfur, and readily forms a sulfide with it. Typical examples of the chalcophile element include Hg, Cu, Pb, Ni, Cd, Fe, Zn, Ag, As, Sb and Bi.

Aqueous solutions containing ions of chalcophile elements are, for example, waste waters which occur in the refining and fabricating of metals and in the material industry. To prevent environmental pollution, these industrial waste waters must generally be discharged after removing noxious elements, especially heavy metals, therefrom. Known methods for removal involve precipitating metals in the form of hydroxide or sulfide, and separating them by filtration. A widely practiced industrial method is based on the separation of metals as hydroxide precipitates, and comprises neutralizing a waste water with an alkaline agent such as sodium hydroxide, calcium carbonate or calcium hydroxide, and separating the resulting metal hydroxide precipitate. When the metals cannot be sufficiently removed by neutralization, a larger amount of the alkali is used to render the waste water excessively alkaline, and the metal hydroxide is separated by filtration. The filtrate, after an acid is added thereto, is discharged. Such a method of precipitating hydroxides by neutralization has the defect that the concentrations of metals remaining in the solution are fairly high and they occasionally cannot be completely removed, and that since the hydroxides formed are difficult to filter and contain large quantities of water, great expenses are required for the filtration step.

The method of removing metals by precipitation of metal sulfides comprises treating a waste liquor with a sulfidizing agent such as hydrogen sulfide or sodium hydrosulfide to precipitate a metal sulfide, and separating the precipitate by filtration. This method has the advantage that the concentrations of metals remaining in the solution are very low, and the sulfide precipitate is easy to filter and has a low water content. However, the sulfidizing agents are toxic, are inconvenient to handle or transport, and complex facilities are required for the sulfidizing operation. Thus, although the sulfide precipitating method has previously be utilized for chemical analysis, it has been adopted only by large scale industries where the disadvantages can be compensated.

The present invention provides a novel process for separating a chalcophile element from an aqueous solution containing it by an electrolytic technique using elemental sulfur as a sulfidizing agent. According to this invention, the defects of the methods described above are eliminated, while the advantages of the sulfide precipitating method are retained.

The process of this invention comprises electrolyzing an aqueous solution containing one or more chalcophile elements in the form of ion as a catholyte under acidic conditions in the presence of elemental sulfur powder suspended therein, to thereby precipitate the chalcophile element in the form of sulfide, and separating the precipitated sulfide from the aqueous layer.

The theory and preferred embodiments of this invention are described in more detail below.

Conventional electrolyzing methods heretofore practiced are based on the utilization of electrochemical reactions, i.e. anodic oxidation and cathodic reduction, which take place on the surfaces of an anode and a cathode in an electrolytic cell when an electric current is passed across these electrodes. In such an electrolytic process, the electrodes are required to be good electric conductors, and an insulator such as elemental sulfur cannot be used as the electrode.

However, the suspension electrolytic process recently developed which performs electrolysis while particles are kept insuspension in an electrolytic solution is based on the utilization of an electrochemical reaction on the surface of the particles. At this time, the suspended particles need not always to be a good electric conductor.

Thus, when by using an electrolytic cell partitioned by a diaphragm into an anode compartment containing an anode and a cathode compartment containing a cathode, an acidic aqueous solution containing an ion of a chalcophile element is introduced as a catholyte into the cathode compartment, and a direct current is passed through the electrolytic cell, while elemental sulfur powder is suspended therein, an electrochemical reaction, i.e. a cathodic reducing reaction, takes place at the surface of the suspended sulfur powder, and the chalcophile element precipitates as sulfide. For example, when a divalent metal is used as the chalcophile element, the reaction shown by equation (1) below takes place on the surface of the sulfur powder.

$$M^{2+} + S° + 2e = MS \quad (1)$$

wherein $M^{2+}$ represents a divalent metal ion, $S°$ represents elemental sulfur, e represents an electron, and MS represents a sulfide of the metal.

When the chalcophile element is a monovalent metal such as Ag or a trivalent metal such as As, Sb or Bi, the metal sulfide is formed by the corresponding reaction.

When arsenic is present, for example, in the form of water-soluble $AS_2O_3$, $As_2S_3$ precipitates by the cathodic reaction of equation (2) below.

$$AS_2O_3 + 6H^+ + 3S° + 6e = As_2S_3 + 3H_2O \quad (2)$$

When the chalcophile element is present in the form of a complexion in an aqueous solution, the corresponding sulfide is precipitated by a cathodic reaction similar to that shown by equation (1).

In this electrolysis, an anodic oxidation reaction occurs at the anode. When, for example, a dilute aqueous solution of sulfuric acid is used as an anolyte, oxygen gas is generated at the anode. The anodic reaction in the anode compartment separated from the cathode compartment by the diaphragm can be suitably selected independently of the cathodic reaction, and therefore, the type of the anolyte is not particularly limited. For example, in the case of treating a waste water, metal ions contained in it are removed in the cathode compartment, and then the solution is sent to the anode compartment. The anodic oxidation reaction which occurs at the anode compartment can be utilized to improve chemical oxygen demand (COD).

The shapes and structures of the electrolytic cell and electrodes are not particularly limited. An ion exchange membrane is desirable as the diaphragm. Howver, a water-permeable diaphragm such as a filter cloth can also by used if care is taken to avoid the mixing of the catholyte with the anolyte. The cathode compartment includes a stirring means for suspending the sulfur powder in the catholyte. The stirring means may be of any desired means capable of effectively suspending the sulfur powder. To perform the electrolyzing operation continuously, an inlet and an outlet for the treating solution are provided in the cathode compartment.

Electrons (e) must be incessantly given to the suspended sulfur particles in order to cause the reaction of equation (1) to proceed toward the right side of equation (1). The mechanism by which electrons are steadily supplied from the cathode to the suspended sulfur particles has not yet been clarified in detail. From an overall viewpoint, it can be said that the suspended sulfur particles receive electrons when they collide with the surface of the cathode by the stirring operation. When the passing of the cell current is stopped, the cathodic reaction also stops.

The resultant sulfide generally precipitates on the surface of the suspended sulfur particles, and gradually penetrates into their interior. At an early stage, the sulfur particles are not easily wetted with water, and tend to come afloat in the catholyte. However, once the sulfide has precipitated on the surface of the sulfur particles, these sulfur particles become wettable and well dispersible in the solution, and therefore, the reaction proceeds smoothly and rapidly. Thus, in order to stabilize the electrolysis operation and to pass a high cell current, it is possible to adhere a small amount (usually not more than 10%) of a sulfide such as copper sulfide to the sulfur particles prior to the electrolysis operation. This can be easily achieved by adding a small amount of $Cu^{2+}$ to the solution, and performing preliminary electrolysis.

The purity of sulfur is not particularly restricted, and commercially available sulfur powders can be used as such. The particle size of the sulfur powder is the one sufficient for it to be suspended in the catholyte by stirring. For this purpose, the sulfur powder preferably has a particle size diameter of about 1 mm or less. The concentration of the sulfur powder suspended is not particularly critical. The concentration of the sulfur powder suspended should desirably by higher when the concentration of the element to be removed is higher and the cell current is made higher for rapid treatment. In practice, the suitable concentration of the sulfur powder suspended is 50 to 300 g/l.

The type and concentration of the chalcophile element ion to be removed from the catholyte are not particularly restricted. When the concentration of an electrolyte present in the catholyte is low, the electric resistance of the solution is high, to cause an increase in the cell voltage. If possible, therefore, it is preferred to add a neutral salt electrolyte such as sodium chloride to the solution in order to increase the electric conductivity of the solution. This also has an effect of promoting the reaction of equation (1).

The catholyte should be maintained acidic. When the pH of the catholyte exceeds 7, the elemental sulfur begins to dissolve. This is undesirable because although the intended electrolytic removal of the chalcophile element is possible, a secondary treatment is required so as to remove the sulfur dissolved in the solution. On the other hand, if the pH of the catholyte is excessively low, the precipitation of sulfide is inhibited by a dissolution reaction in accordance with equation (3) below.

$$MS + 2H^+ = M^{2+} + H_2S \tag{3}$$

The pH of the catholyte is suitably selected depending upon the type of the element to be removed and the allowable concentration of the remaining element. This will be more generally explained below. The equilibrium of equation (3) is expressed by the following equation.

$$K = \frac{(M^{2+})(H_2S)}{(H^+)^2} \tag{4}$$

wherein K is an equilibrium constant. When the $H^+$ concentration is excessively high at a certain $M^{2+}$ concentration, the $H_2S$ concentration increases in order for K to be constant. In other words, when the pH is excessively low, MS dissolves, and the reaction of equation (3) proceeds toward the right side. In contrast, when the $M^{2+}$ concentration becomes low, the $H^+$ concentration should decrease accordingly. In other words, when the $M^{2+}$ concentration decreases as a result of the precipitation of MS, the pH should be maintained higher accordingly. The value of K is peculiar to an element, and can be obtained by an ordinary thermodynamical calculation. For example, the K value for ($Cu^{2+}$) and K for ($Zn^{2+}$) are $10^{15.2}$ and $10^{1.1}$, respectively. When the K value is larger, the sulfide can be precipitated at a lower pH. In this way, from a known K value for another element, a suitable pH can be easily known. The differences in pH values suitable for the individual elements can be utilized for the selective removal of these elements.

When the concentration of the remaining chalcophile element ion decreases in the catholyte, an increase in cell voltage and a decrease in the suspension potential of the catholyte are noted. Hence, the end point of electrolysis can be judged on the basis of such changes. In continuous electrolysis, the concentration of the remaining element in the catholyte can be maintained at a fixed desired value by maintaining the suspension potential of the catholyte at a certain set value by adjusting the speed of feeding the solution to be treated and the cell current.

The temperature of the cell is not particularly limited, but is preferably room temperature or higher temperatures. Of course, it should not exceed 100° C. under atmospheric pressure. The cell temperature can be easily maintained at about 40 to 60° C. if heat generation incident to the electrolysis is utilized. This is an especially preferred temperature range.

The process of this invention enables almost entire amounts of chalcophile elements to be removed as sulfides from aqueous solutions containing them, and the amounts of the remaining elements can be reduced to traces. The resulting sulfides can be obtained as a cake which is easy to filter and has a low water content. As required, the sulfide cake can be subjected to desulfurizing treatment in a customary manner to recover the chalcophile element.

The process of the electrolytic removal of chalcophile elements from aqueous solutions in accordance with this invention described hereinabove has various advantages. For example, it is possible to use as a sulfidizing agent elemental sulfur which is easy to handle and is inexpensive. No complex device is required, and the operation is easy and simple. The chalcophile elements to be removed can be almost completely removed from aqueous solutions thereof. The precipitated sulfides can be recovered as a cake which is easy to filter and has a low water content. The chalcophile elements can then be removed individually in a selective manner.

EXAMPLE 1

Experiment of removing Cu from an aqueous solution containing Cu:-

A vertical, cylindrical electrolytic cell having an inside diameter of 14 cm was partitioned by a horizontal cation exchange membrane into an upper cathode compartment (1.5 liters) and a lower anode compartment (0.3 liter). In the cathode compartment were provided a cathode composed of a titanium mesh having a mesh size of about 5 mm, a stirring blade (diameter 8 cm, rotating speed about 800 rpm), a glass electrode for pH measurement, a platinum electrode and a saturated calomel electrode for measurement of suspension potential, and a thermometer. A platinum mesh electrode having a mesh size of about 5 mm was provided in the anode compartment. An anolyte containing 1 mole/liter of $Na_2SO_4$ and adjusted to pH ca. 1 with sulfuric acid was circulated in the anode compartment at a rate of about 500 ml/min. Oxygen gas which was generated on the anode during the electrolysis was entrained in the circulating solution and driven out of the electrolytic cell.

Using two solutions having different initial concentrations of Cu, two batchwise runs Nos. 1 and 2 below were conducted.

No. 1

Into the cathode compartment was introduced 1.5 liters of an aqueous solution containing 1 mole/liter of $Na_2SO_4$ and 8.3 g/liter of $Cu^{2+}$ (as $CuSO_4$) and adjusted to pH ca. 1 with sulfuric acid, and 200 g of commercially available sulfur powder was added to the solution. The catholyte was stirred, and while suspending the sulfur powder in this way, the catholyte was electrolyzed at 60° C.

When preliminary electrolysis was performed for 2 hours at a cell voltage of 1 A, the suspended sulfur powder in the catholyte turned from yellow to gray, and then to black. Subsequently, the current was raised to 2A, and the electrolysis was continued for 1 hour and 45 minutes. The concentration of $Cu^{2+}$ in the catholyte gradually decreased. Finally, the current was lowered to 1A, and the electrolysis was performed for 1 hour and 10 minutes, and the operation was terminated. The $CuSO_4$ concentration of the catholyte was 0.88 ppm. The current efficiency corresponded to 106%. It is due presumably to an experimental error that the current efficiency calculated on the basis of the amount of electricity that was passed and the amount of the removed metal exceeded the theoretical value 100%.

No. 2

After the end of the Run No. 1 above, copper sulfate was freshly charged to provide a catholyte having an initial $CuSO_4$ concentration of 11.47 g/liter. This catholyte was electrolyzed for 6 hours and 20 minutes to obtain a solution having a $CuSO_4$ concentration of 0.06 ppm.

The results of Runs Nos. 1 and 2 are shown in Table 1.

Table 2 shows the relation between the concentration of residual $CuSO_4$ in the solution and the suspension potential at this time, which were measured in the course of Run No. 2. It is seen from the Table that the approximate concentration of residual $CuSO_4$ can be known by measuring the suspension potential.

Table 1

| Run | Time elapsed (hr, min) | Current (A) | Concentration of $CuSO_4$ Initial | Concentration of $CuSO_4$ At the end | Current efficiency at the cathode |
|---|---|---|---|---|---|
| No. 1 | 0, 00–2, 00 | 1 | 8.30 g/l | | |
|  | 2, 00–3, 45 | 2 | | | 106% |
|  | 3, 45–4, 55 | 1 | | 0.88 ppm | |
| No. 2 | 0, 00–1, 00 | 2 | 11.47 g/l | | |
|  | 1, 00–2, 00 | 3 | | | 113% |
|  | 2, 00–6, 00 | 2 | | | |
|  | 6, 00–6, 12 | 1 | | | |
|  | 6, 12–6, 20 | 0.2–0.1 | | 0.06 ppm | |

Table 2

| $CuSO_4$ concentration | Suspension potential (V) |
|---|---|
| 11.47 g/l | 0.285 |
| 4.09 g/l | 0.254 |
| 0.22 g/l | 0.208 |
| 2.16 ppm | 0.05–0.08 |
| 0.06 ppm | minus 0.025 |

EXAMPLE 2

Experiment of removing Zn:

The same electrolytic cell as described in Example 1 was used, and operated in the same way as in

EXAMPLE 1.

Into the cathode compartment was introduced 1.5 liters of an aqueous solution containing 1 mole/liter of $Na_2SO_4$ and 5.55 g/liter of $Zn^{2+}$ (as $ZnSO_4$) and adjusted to pH ca. 3 with sulfuric acid, and 200 g of sulfur powder containing 4.8% by weight of CuS was added to the solution. The catholyte was electrolyzed with stirring at 60° C. while maintaining its pH at 3–4 by addition of sodium hydroxide. The results are shown in Table 3.

Table 3

| Time elapsed (hr, min) | Current (A) | $Zn^{2+}$ concentration Initial | $Zn^{2+}$ concentration At the end | Current efficiency at the cathode |
|---|---|---|---|---|
| 0, 00–6, 40 | 1 | 5.55 g/l | | 101% |
| 6, 40–7, 00 | 0.1 | | 0.18 ppm | |

This experiment shows that a metal having a large ionizing tendency such as Zn can also be effectively removed. This means that the process of this invention is applicable to chalcophile elements having a lesser ionizing tendency than Zn.

EXAMPLE 3

Experiment of removing Zn:

The same procedure as in Example 2 was performed except that 200 g of sulfur powder not contaminated with CuS was used, and the batchwise experiment of removing $Zn^{2+}$ was performed three times. At the beginning of the second and third runs, a fresh supply of $ZnSO_4$ was added to the cathode compartment in the same way as described in Example 1. The results are shown in Table 4.

Table 4

| Run | Time elapsed (hr, min) | Current (A) | Zn concentration Initial | Zn concentration At the end | Current efficiency at the cathode |
|---|---|---|---|---|---|
| 1st | 0, 00–5, 00 | 1 | 5.19 g/l | | |
|  | 5, 00–13, 15 | 0.5 | | | 71% |
|  | 13, 15–13, 30 | 0.1 | | 7.38 ppm | |
| 2nd | 0, 00–1, 00 | 1 | 5.44 g/l | | |
|  | 1, 00–2, 00 | 2 | | | |
|  | 2, 00–3, 35 | 1 | | | 98% |
|  | 3, 35–3, 40 | 0.1 | | | |
|  | 3, 40–4, 10 | | | 0.30 ppm | |
| 3rd | 0, 00–2, 40 | 3 | 5.44 g/l | | 79% |
|  | 2, 40–3, 00 | 1 | | 0.06 ppm | |

When Table 4 is compared with Table 3 in Example 2, it is seen that a better current efficiency is obtained in the case of using a sulfur powder containated with CuS (Example 2). It is also seen that by the repetitive use of the sulfur powder, the current efficiency is greater in the second run than in the first run, and a progressively higher cell current can be passed (3rd>2nd>1st).

EXAMPLE 4

Experiment of removing various elements:

A vertical, rectangular-parallelpipedal filter press-like electrolytic cell having an inside dimension of 14 cm in length, 4 cm in width and about 11 cm in height was divided by an anion exchange membrane into an anode compartment (provided with a lead plate anode) having a width of 2 cm and a cathode compartment (provided with a titanium mesh cathode) having a width of 2 cm. An anolyte and a catholyte contained in two separately provided 4-liter reservoir tanks were passed each at a flow rate of 15 liters/min. from the lower inlets toward the upper outlets of the anode compartment and the cathode compartment respectively by means of two centrifugal pumps. The anolyte and the catholyte were thus circulated between the reservoir tanks and the anode compartment and the cathode compartment respectively. The anolyte was a dilute aqueous sulfuric acid solution having a pH of about 3, and the catholyte was a mine waste water containing the elements indicated in Table 5 in low concentrations.

Table 5

| Metal ion | Cu | Zn | Cd | Fe | As | pH |
|---|---|---|---|---|---|---|
| Concentration (ppm) | 530 | 260 | 6.3 | 2020 | 0.06 | 3.2 |

Into the catholyte was put 320 g (80 g/liter) of a sulfur powder containing about 3% by weight of Cu, and the resulting sulfur-suspended solution was electrolyzed while it was passed through the cathode compartment by means of the pump. In this case, the sulfur particles were suspended by circulating the solution by the pump, and were continuously caused to flow without giving these particles the time to settle within the electrolytic cell.

The electrolysis was carried out at room temperature. In the first-stage electrolysis, a current of 2A was passed without adjusting the pH of the electrolyte solution, and $Cu^{2+}$ was removed. Then, the pH of the solution was increased to 4.6 by using sodium hydroxide, and the second-stage was performed at 2A to remove $Zn^{2+}$. Table 6 shows the electrolyzing conditions and the concentrations of residual elements.

Table 6

| | Cell current (A) | Cell voltage (V) | Time (hrs) | pH | Concentration of residual elements (PPM) Cu | Zn | Cd | Fe | As | Suspension potential at the end of electrolysis (V) |
|---|---|---|---|---|---|---|---|---|---|---|
| First-stage electrolysis | 2 | 9.1 | 2.5 | 3.2→3.6 | 0.60 | 267 | 2.5 | 390 | trace | 0.17 |
| Second-stage electrolysis | 2 | 8.7 | 2 | 4.6→4.5 | trace | 0.6 | 0.08 | 160 | trace | −0.23 |

By the first-stage electrolysis, Cu and As were removed almost completely, but Zn remained in the solution. A part of Cd and about 80% of Fe were removed simultaneously. By the second-stage electrolysis at an increased pH, Zn and Cd were removed almost completely. The current efficiency of the first-stage electrolysis was 72% for Cu, and the current efficiency of the second-stage electrolysis was 45% for Zn.

These results show that the present invention can be applied to solutions containing various chalcophilic element ions in low concentrations.

What we claim is:

1. A process for removing a chalcophile element from an aqueous solution containing said element in the form of ion, which comprises electrolyzing said aqueous solution as a catholyte under acidic conditions in the presence of elemental sulfur powder suspended therein to precipitate the chalcophile element in the form of sulfide, and separating the precipitated sulfide from the aqueous layer.

2. The process of claim 1 wherein the sulfur powder is kept suspended in the catholyte so that it collides with the surface of a cathode when the catholyte is stirred.

3. The process of claim 1 wherein the amount of the sulfur powder is 50 to 300 g per liter of the catholyte.

4. The process of claim 1 wherein the catholyte is held in a cathode compartment by a diaphragm so that it does not get mixed with an anolyte not containing a chalcophile element ion.

5. The process of claim 1 wherein the sulfur powder is a sulfur powder having adhered thereto a small amount of a sulfide of the chalcophile element.

6. The process of claim 1 wherein the electrolysis was carried out at a temperature ranging from room temperature to 100° C.

7. The process of claim 1 wherein the electrolysis is carried out at a temperature of from 40° C. to 60° C.

8. The process of claim 1 wherein the catholyte contains two or more chalcophile elements, and is electrolyzed two or more times at varying acidities according to the types of the elements thereby to precipitate these elements separately.

9. The process of claim 1 wherein when the starting aqueous solution has a low conductivity, a small amount of an electrolytic neutral salt is dissolved in it to provide an aqueous solution having an increased conductivity which is used as the catholyte.

10. The process of claim 1 wherein the electrolysis is continuously carried out while continuously withdrawing the catholyte solution containing the remaining chalcophile element ion in a predetermined decreased concentration as a result of electrolysis and continuously feeding the starting aqueous solution.

* * * * *